(12) United States Patent
Shalunov et al.

(10) Patent No.: US 11,108,855 B2
(45) Date of Patent: Aug. 31, 2021

(54) NEWNODE: DECENTRALIZED CONTENT DISTRIBUTION NETWORK

(71) Applicant: Clostra, Inc., San Francisco, CA (US)

(72) Inventors: Stanislav Shalunov, Concord, CA (US); Gregory Hazel, San Francisco, CA (US)

(73) Assignee: CLOSTRA, INC., San Francisco, CA (US)

( * ) Notice: Subject to any disclaimer, the term of this patent is extended or adjusted under 35 U.S.C. 154(b) by 0 days.

(21) Appl. No.: 16/379,533

(22) Filed: Apr. 9, 2019

(65) Prior Publication Data

US 2019/0312927 A1 Oct. 10, 2019

Related U.S. Application Data

(60) Provisional application No. 62/654,541, filed on Apr. 9, 2018.

(51) Int. Cl.
| | |
|---|---|
| *H04W 4/80* | (2018.01) |
| *H04L 29/08* | (2006.01) |
| *H04W 4/70* | (2018.01) |
| *H04L 9/32* | (2006.01) |

(52) U.S. Cl.
CPC ........ *H04L 67/1074* (2013.01); *H04L 9/3247* (2013.01); *H04L 67/1091* (2013.01); *H04L 67/2842* (2013.01); *H04W 4/70* (2018.02); *H04W 4/80* (2018.02)

(58) Field of Classification Search
CPC .................................................. H04L 67/1074

USPC ......................................................... 709/238
See application file for complete search history.

(56) References Cited

U.S. PATENT DOCUMENTS

| | | | |
|---|---|---|---|
| 2009/0100128 A1* | 4/2009 | Czechowski, III | ......................... H04L 67/1076 709/203 |
| 2013/0276024 A1* | 10/2013 | Grant | ................. G06Q 30/0269 725/34 |
| 2015/0382088 A1* | 12/2015 | Braun | ................ H04N 21/6175 398/61 |
| 2017/0048280 A1* | 2/2017 | Logue | ................. H04W 12/003 |
| 2018/0255175 A1* | 9/2018 | Tran | .................... H04L 67/2819 |

(Continued)

*Primary Examiner* — Sibte H Bukhari
(74) *Attorney, Agent, or Firm* — Womble Bond Dickinson (US) LLP; Joseph Bach, Esq.

(57) ABSTRACT

A method and apparatus of a device that downloads content to a local device using a decentralized content distribution network is described. In an exemplary embodiment, the device receives a request from an application to download content using the decentralized content distribution network. In addition, the device determines a plurality of nodes in the decentralized content distribution network to download the content. For each of the plurality of nodes, the device attempts to establish communications between the device and that node. In addition, the device downloads a portion of the content from that node if communication is established between the local device and that node, wherein the size of the portion is based on at least a characteristic of that node. Furthermore, the device downloads a portion of the content from a proxy if communication cannot be established between the local device and that node, wherein the size of the portion is based on at least a characteristic of that proxy.

16 Claims, 7 Drawing Sheets

(56) References Cited

U.S. PATENT DOCUMENTS

2019/0306173 A1* 10/2019 Reddy .................... H04L 9/321

* cited by examiner

NEWNODE: DECENTRALIZED CONTENT DISTRIBUTION NETWORK

RELATED APPLICATIONS

This application claims priority benefit from U.S. Provisional Application No. 62/654,541, filed Apr. 9, 2018, the disclosure of which is incorporated herein in its entirety.

BACKGROUND

1. Field

Embodiments of the present invention relate generally to content distribution networks, distributed systems, delay-based congestion control, and device-to-device connections.

2. Related Arts

The content distribution network (CDN) market, valued at $3.61B, continues to restructure as it grows and prices fall. More CDNs are being offered, and multiple CDN use is a growing trend among content providers, even small ones. This benefits smaller and cheaper CDNs and harms CDNs with large market shares, such as Akamai, which get fewer exclusive contracts.

Traditional CDNs place cache servers into edge networks, effectively reducing backbone traffic, but the most important and expensive link of a typical user's Internet connection is the final mile, where each copy of a file must be downloaded individually. For example, during a mass rollout of a new iOS version, as much as 10-20% of an edge network's traffic consists of downloads of the same file, with multiple copies flowing into the same household as multiple devices are simultaneously upgraded. This represents suboptimal use of a network's resources and causes download delays for many users. For example, when an office full of software engineers is required to download a new version of Xcode before continuing work, hundreds of gigabytes of data are needlessly transferred while productivity plummets.

Many games, both mobile and desktop, are very resource-intensive and require the transfer of hundreds of megabytes or gigabytes of data before the user can play. If such network transfers fail before a user is able to first play the game, it is very likely that the person will be lost and will not continue to engage. A small percentage of users are lost in this way every year, representing billions of dollars in losses for a large and successful game.

Today's CDNs largely fail to take advantage of the possibility of peer-to-peer connections on local networks, between nearby devices, and beyond.

Technology has caught up to the problem. Previous attempts to create tools for decentralized content distribution have been made, without significant deployment. The industry faces a confluence of two trends: the creation of the necessary technologies for CDN decentralization and the move to mobile.

Previous implementations lacked two critical technical pieces: 1) the ability to move large amounts of data without hindering network performance, and 2) the ability to form off-Internet connections. Both puzzle pieces are now in place. Previous attempts to deploy tools such as BitTorrent DNA, which had the first piece of the puzzle, ran into the problem of requiring browser support, since nearly all content was accessed through the browser. Today, less than 50% of online time is spent using browsers, with a growing majority focused on mobile apps. Mobile apps, unlike websites, have a key advantage for deployment: they can easily incorporate a native SDK with rich functionality, making wide adoption both easier far more likely.

In view of the above, there's a need to enable efficient transfer of files onto computing devices. The transfer of files should substantially reduce or eliminate duplicate transfer of same files over the network, to reduce the load on the network, and avoid congestion, especially during times of high demand, such as the distribution of new version of software.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

A method and apparatus of a device that downloads content to a local device using a decentralized content distribution network is described. In an exemplary embodiment, the device receives a request from an application to download content using the decentralized content distribution network. In addition, the device determines a plurality of nodes in the decentralized content distribution network to download the content. For each of the plurality of nodes, the device attempts to establish communications between the device and that node. In addition, the device downloads a portion of the content from that node if communication is established between the local device and that node, wherein the size of the portion is based on at least a characteristic of that node. Furthermore, the device downloads a portion of the content from a proxy if communication cannot be established between the local device and that node, wherein the size of the portion is based on at least a characteristic of that proxy.

In a further embodiment, a device that downloads content to a local device using a decentralized content distribution network is described. In this embodiment, the device receives an application request from an application to download content using the decentralized content distribution network. In addition, the device determines a size of the content and a plurality of nodes in the decentralized content distribution network to download the content. Furthermore, for each of the nodes in the plurality of nodes, the device determines a portion of the content for that node and downloads the portion of the content from that node.

Other methods and apparatuses are also described.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

For a more complete understanding of the invention, reference is made to the following description and accompanying drawings, in which.

DETAILED DESCRIPTION

Figure 1:
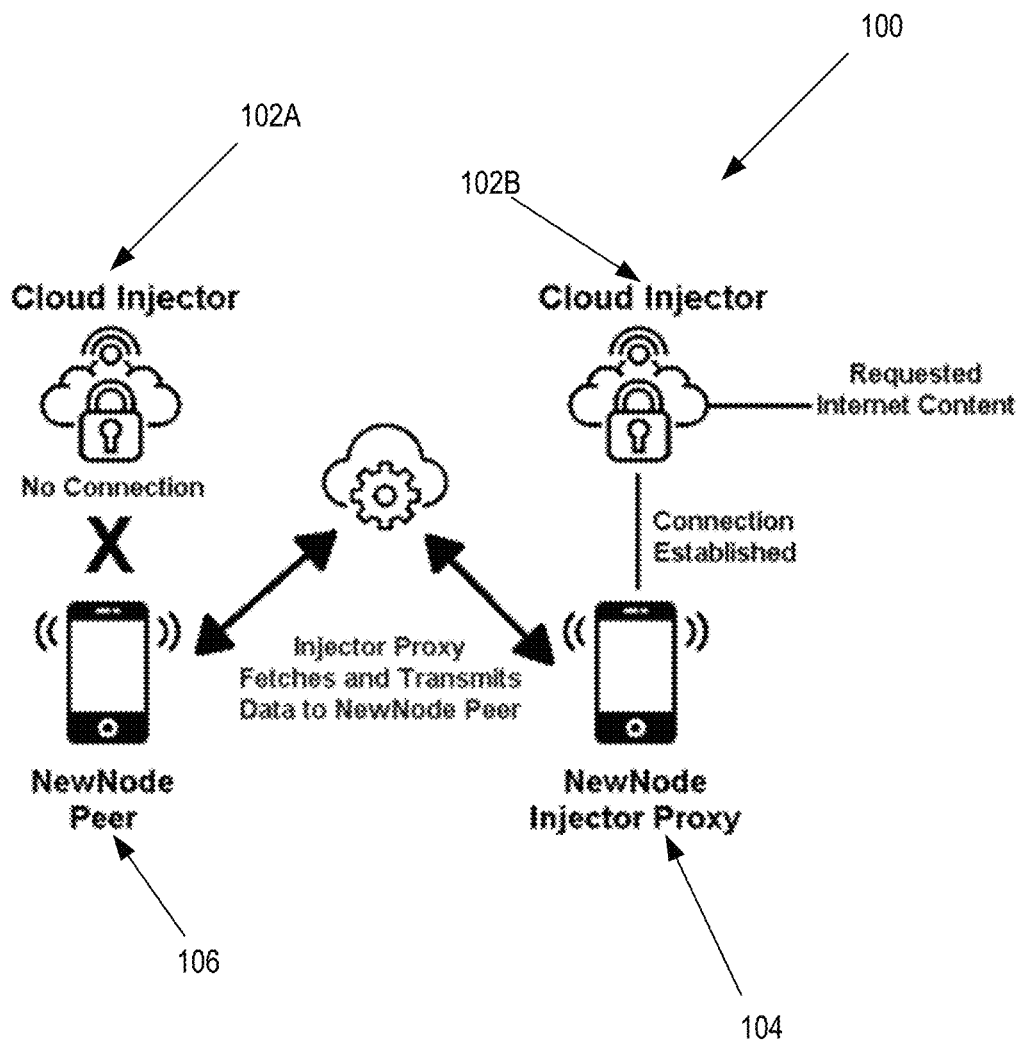
FIG. 1 is an illustration of an embodiment of the inventive NewNode architecture.

The following detailed description provides examples that highlight certain features and aspects of the innovative decentralized content distribution network claimed herein. Different embodiments or their combinations may be used for different applications or to achieve different results or benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments, but are not limited to the disclosed embodiments. That is, the features disclosed herein are not limited to the embodiment within which they are described, but may be "mixed and matched" with other features and incorporated in other embodiments.

Disclosed embodiments provide a decentralized content distribution network (dCDN), which enables efficient transfer of files while lifting the load from the communication networks.

In disclosed embodiments, dCDN is implemented as a Software Development Kit (SDK), allowing application access to online content more inexpensively and reliably than traditional CDNs. The dCDN SDK seamlessly builds a decentralized peer-to-peer content distribution network using both Internet and device-to-device connections. The customers are primarily mobile app developers wishing to reduce their content distribution network costs and improve their app's reliability and DDoS resilience. The dCDN SDK is designed for simplicity and usability by mobile app developers, even those relatively unsophisticated in network-related engineering.

The following comparisons put the dCDN into context. One key difference between a dCDN and a CDN is the existence of device-to-device connections, providing unparalleled robustness.

Major differences between a dCDN and a conventional CDN are:
 1. A CDN requires the installation and maintenance of physical infrastructure, while a dCDN does not require a physical infrastructure;
 2. A conventional CDN is an alternative to other conventional CDN, while dCDN can be used together with one conventional CDN or enable the customer to use multiple CDNs at once easily and transparently; and
 3. A dCDN is fundamentally cheaper.

For example, Akamai Download Manager, a popular CDN based on Red Swoosh, is an inferior copy of BitTorrent, while dCDN integrates recent technological advances. Differences between Akamai Download Manager, and dCDN include but are not limited to:
 1. The dCDN uses the Low Extra Delay Background Transport (LEDBAT) protocol. Akamai Download Manager is where BitTorrent stood in 2007 in this regard.
 2. The dCDN uses a powerful DHT of 250M nodes to provide reliability and redundancy in the components that would otherwise need to be centralized. As a result, the dCDN works even when all central infrastructure is unreachable. Akamai Download Manager does not.
 3. The dCDN has the ability to build its own additional device-to-device connectivity, relieving existing networks of congestion and repeated transfers. Akamai Download Manager does not.
 4. dCDN is seamlessly peer-to-peer. Akamai Download Manager requires extra actions from users to achieve this. When a user wants to download a large file which Akamai can serve over their peer-to-peer network, they are told to download and install the "Akamai NetSession Interface," which acts as a download manager and a peer-to-peer client. Since many users are unaware of Akamai's role in content delivery, they are often suspicious and refuse the additional installation.

In the peer-to-peer space, BitTorrent more closely resembles dCDN functionality than Akamai Download Manager does, but at root it is substantially different. BitTorrent can only be used for specific files deliberately transmitted, and separates host swarms by content, while dCDN has all the nodes on the network working together. In general, BitTorrent is too complicated and industrial for use by the relatively few CDN customers taking the DIY route.

In one embodiment, dCDN is faster, cheaper, and more reliable than existing web downloads, provides seamless content ingestion from the web, includes a library which can easily be embedded into other apps, improves performance, and is easier to integrate than even conventional CDN.

Reliability and predictability are crucial aspects of any standard CDN performance. Considering an origin download process, performance can only be enhanced by implementing dCDN. The bigger the dCDN, the better it functions. With few nodes, there are fewer candidates to perform any of the dCDN functions, making it difficult for the network to recover from failure. Node multiplicity provides redundancy, increase stability, and improves performance.

A key metric for any content distribution system is speed. People care how quickly something works more than any other factor. One example of this fundamental user preference was the rapid switch from eDonkey to BitTorrent: eDonkey was an established market leader in the peer-to-peer downloads space, but users were motivated to switch to BitTorrent, despite initial disadvantages in other areas, because of markedly improved download performance. For users, speed is the critical factor determining product choice.

Implemented embodiments of dCDN work seamlessly for end users. For any content distribution system, the goal is to deliver bytes to the destination. From the point of view of the end user, the ideal distribution system is an implementation detail chosen by app developers, providing excellent performance and running seamlessly in the background. Akamai Download Manager requires a separate download and installation, while dCDN is invisible, requiring no additional installation and no input from the end user.

The dCDN has no negative impact on end user experience. A key requirement of adoption is that the functions that a node performs for the benefit of delivering content to others do not adversely affect the user's own experience.

Network performance for other apps and battery life should not be impacted. Prior to 2008, versions of BitTorrent essentially hijacked their local networks, saturating the uplink buffer, driving round-trip latency to seconds, and making the network unusable for traffic other than BitTorrent. Because of the value users received from BitTorrent, and its superiority to any alternatives, users forgave this deficiency and worked around the problem by running the software at night or by setting manual limits. The introduction of LEDBAT, which allowed BitTorrent to use 100% of network capacity without adversely impacting other traffic, immediately stepping aside as capacity was required by other applications, allowed the user base to expand from a limited number of technically savvy people capable of working around the limitations of BitTorrent to average consumers. Today, expectations for content distribution systems are higher than in the past, and negative impact upon unrelated Internet traffic is a total nonstarter, thus requiring the use of LEDBAT.

The dCDN SDK allows developers to quickly master and deploy dCDN-enabled networks, accelerating wide adoption due to its streamlined implementation. Some dCDN developers are sophisticated enough to create standalone network-related tools; most, however, are user interface developers who are creating a mobile game that needs to download content packs or a simple mobile container app, such as those used by The New York Times or the BBC. For the latter class of developer, ease of SDK integration is crucial.

A general-purpose dCDN delivers static content-addressable objects with, optionally, opportunistic encryption.

In one embodiment, dCDN can be thought of as a peer-to-peer system which delivers arbitrary content. While the BitTorrent network is segmented by host swarm for the purposes of data connections—one for each piece of content—every dCDN node is part of the same swarm, capable of serving many different types of content. BitTorrent already makes its distributed hash table (DHT) global using this method. dCDN extends this feature to its logical conclusion, merging the transport swarms. This has key advantages when many smaller objects are required rather than, as is typical in the BitTorrent, a few very large ones (such as movie or music files).

LEDBAT is a congestion control protocol used by BitTorrent for transfers, by Apple for Software Updates, and, since the summer of 2016, by Microsoft in Windows 10, as well as by countless other companies distributing bulk data in background. LEDBAT is estimated to carry 13-20% of Internet traffic.

Before it used LEDBAT, BitTorrent would overwhelm the network, making it unusable for any other traffic. Adopting LEDBAT allowed BitTorrent to vastly expand the user base, have better relations with internet service providers, and made the software easier to use.

LEDBAT works by continuously measuring the one-way delay from the sender to the receiver and adjusting the sending rate to target a predetermined low target extra delay. The target is chosen so that it is low enough not be have a perceptible effect for human interactions. The mechanism by which LEDBAT accomplishes this is based on control theory.

BitTorrent DHT is the largest currently deployed decentralized, serverless piece of infrastructure on the Internet, encompassing a quarter billion nodes. The DHT allows one to store short byte snippets in the distributed system, making it ideal for resource location.

In one embodiment, dCDN takes advantage of the deployed BitTorrent base as a robust discovery mechanism. Thus, existing BitTorrent clients can help get the system running and helping to solve the initial bootstrapping problem.

Device-to-device (D2D) connectivity, pioneered in FireChat, allows people to build a network without any infrastructure, even when the Internet is not functional. This also works with laptops, which of course become more important for content distribution. D2D connectivity adds a layer of independence from other factors not available with any other techniques.

In one embodiment, before content can be accessed by the peer-to-peer component of the system, the content needs to be ingested. In this embodiment, ingestion is the process of making the content addressable by URL or URL plus a content hash. Ingestion is handled by an injector, which is a trusted party that authenticates and adds the content to the dCDN. During content ingestion, a web download from the origin can be started, so that the dCDN can deliver the content faster using the dCDN peer-to-peer and device-to-device techniques, and not slowing content delivery down. With the content ingested, the content can be addressed by URL or by URL plus content hash. Any node in the dCDN can request the ingestion of some piece of content by URL or by URL plus content hash. Furthermore, any node can elect to act as an ingestion bridge when ingesting by URL plus content hash. Ingestion probability is based on local policy and history of ingestion success. Thus, in an environment where ingestion does not work, ingestion by a node may not make sense to try.

In one embodiment, content ingestion by URL alone—or rather, the act of supplying a content hash for a given URL—is sensitive. There will be three stages in implementing it: any node, trusted nodes, and a Byzantine reputation system.

Option 1—Ingestion by anyone: In this embodiment, the same rules apply to ingestion by URL as to ingestion by URL plus content hash.

Option 2—Ingestion by trusted nodes: The mapping from URL to URL plus content hash in the DHT is protected by a public key signature in this case. The public keys are embedded in the dCDN clients. A set of well-connected trusted nodes are each in possession of one of the private keys. These nodes act as an ingestion bridge and also help seed the content. In one embodiment, these nodes perform a functionality that is similar to uploaders in BitTorrent or exit nodes in Tor.

Option 3—Byzantine reputation system: Each node willing to act as an ingestion bridge uses its own public/private key pair. In this embodiment, none of these nodes are inherently trusted, but these nodes can build up reputation among themselves and with the consumer nodes. Each time a node ingests correctly and timely some resource for the first time, the reputation of the node improves; when that ingests incorrectly or too slowly to matter, the node reputation drops.

For any option: Once the content is ingested, the content becomes content-addressable.

When data is transferred between nodes, in one embodiment, the data can be opportunistically encrypted, similarly to BitTorrent's encrypted mode, but using different modern primitives. For example and in one embodiment, dCDN can employ different hash functions and/or cryptographic processes (e.g., BLAKE, SALSA20, and/or other various types of hash functions and/or cryptographic processes). This protects privacy and security of communication and is used in the same scenarios as HTTPS for static content.

From a developer's perspective, dCDN integration consists of
1. linking against the SDK; and
2. replacing the OS API calls that fetch HTTP(S) objects with call into the dCDN by adding a couple of letters to the beginning of their names.

The process is designed to be straightforward to implement for any mobile app developer, including ones without background in networks and content distribution.

For example, in the case of Android, there's a replacement for httpClient.execute and, in the case of iOS, for dataWithContentsOfURL. These are direct replacements which allow a developer to use the new calls into the dCDN the same way they would use the usual OS API calls.

This mechanism of integration makes it so that users do not have to do anything extra to use the dCDN. Whether to even expose the existence of the dCDN to the end users is a decision left up to the integrating software.

In a further embodiment, an even easier for a developer's mechanism of integration is through the use of http_proxy setting: on Android, for example and in one embodiment, this proceeds as follows: The developer of the mobile application integrating the SDK adds the SDK to the build and (optionally) invokes an initialization method. Explicit or implicit initialization mechanism subsequently sets up the proxy setting so that all connections flow through the proxy operated locally (and addressed through an IP address associated with the local host). In another embodiment, a proxy can be set up on the mobile device such that each URL request is routed through this proxy. In this embodiment, by configuring this local proxy on the mobile device, there is not a need to compile in the dCDN SDK.

As described above, LEDBAT can be used as an underlying protocol for the content distribution. In one embodiment, the use of LEDBAT eliminates the impact that peer-to-peer apps can have on the network performance for other apps: the content distribution lets the entire capacity of the network be exploited while avoiding interfering with other traffic. When implemented on a mobile device, the system would only serve others either when the application is in use, or when the device is plugged in and connected to Wi-Fi, to prevent excessive data usage or impact on battery life.

In one embodiment, any object can be fetched from a variety of sources, including the origin (e.g., the device and path represented by the URL for the requested content). This guarantees that performance can only be improved. An option to avoid origin fetching will be provided for applications that either want the savings of directing more traffic peer-to-peer, or that wish to do so for policy reasons or user choice. Multiple sources allow for both faster and more predictable downloads, similarly to BitTorrent.

In one embodiment, dCDN provides:
1. a mechanism for locating content that can be served by the peers;
2. a mechanism for ingestion of new content; and
3. content delivery using one or more peer-to-peer or a device-to-device connection plus, optionally, origin.
In this embodiment, This is a usable dCDN embodiment that can be improved by a variety of features.

FIG. 1 is an illustration of an embodiment of the system 100 that is part of the dCDN. In FIG. 1, system 100 includes a peer 106 that wishes to download content using the dCDN. In one embodiment, the peer 106 checks for a connection to the cloud injector 102A. In one embodiment, a cloud injector 102A-B is a trusted party that authenticates and adds the content to the dCDN. In this embodiment, each cloud injector 102A-B has a private key that is used to sign the content by creating signature. While in one embodiment, the cloud injector 102A-B creates a Merkle tree for the signature using the private key, in alternate embodiments, the cloud injector 102A-B can create a different type of cryptographic signature (e.g., the X-Sign format described below). In one embodiment, by cryptographically signing the content from a trusted partner, a peer (such as peer 106) will know that the content added to the dCDN has been authenticated. This is different from BitTorrent, where anyone can add content by creating a torrent file and a peer does not if the content from the torrent is authentic or has been maliciously altered.

In one embodiment, the peer 106 can request the content from the injector 102A using the DHT described above. In one embodiment, the peer 106 attempts to connect to the injector 102A for the particular content. In this embodiment, the connection not available to the injector 102A, so the peer 106 attempts to the get the content form another source, such as the injector proxy 104. In one embodiment, an injector proxy 104 is as a proxy for an injector 102B. The peer 104 can identify the injector proxy 104 by reading an injector proxy swarm, using cached proxy addressing information, and/or using peer exchange for an injector proxy swarm. With a successful connection to the injector proxy 104, the proxy 104 can fetch and transmit data to the peer 106. In one embodiment, the injector proxy connects to a different injector, namely injector 102B, which requests the content. The requested content can be routed to the peer 106 via the injector 102B and the injector proxy 104.

Figure 2:
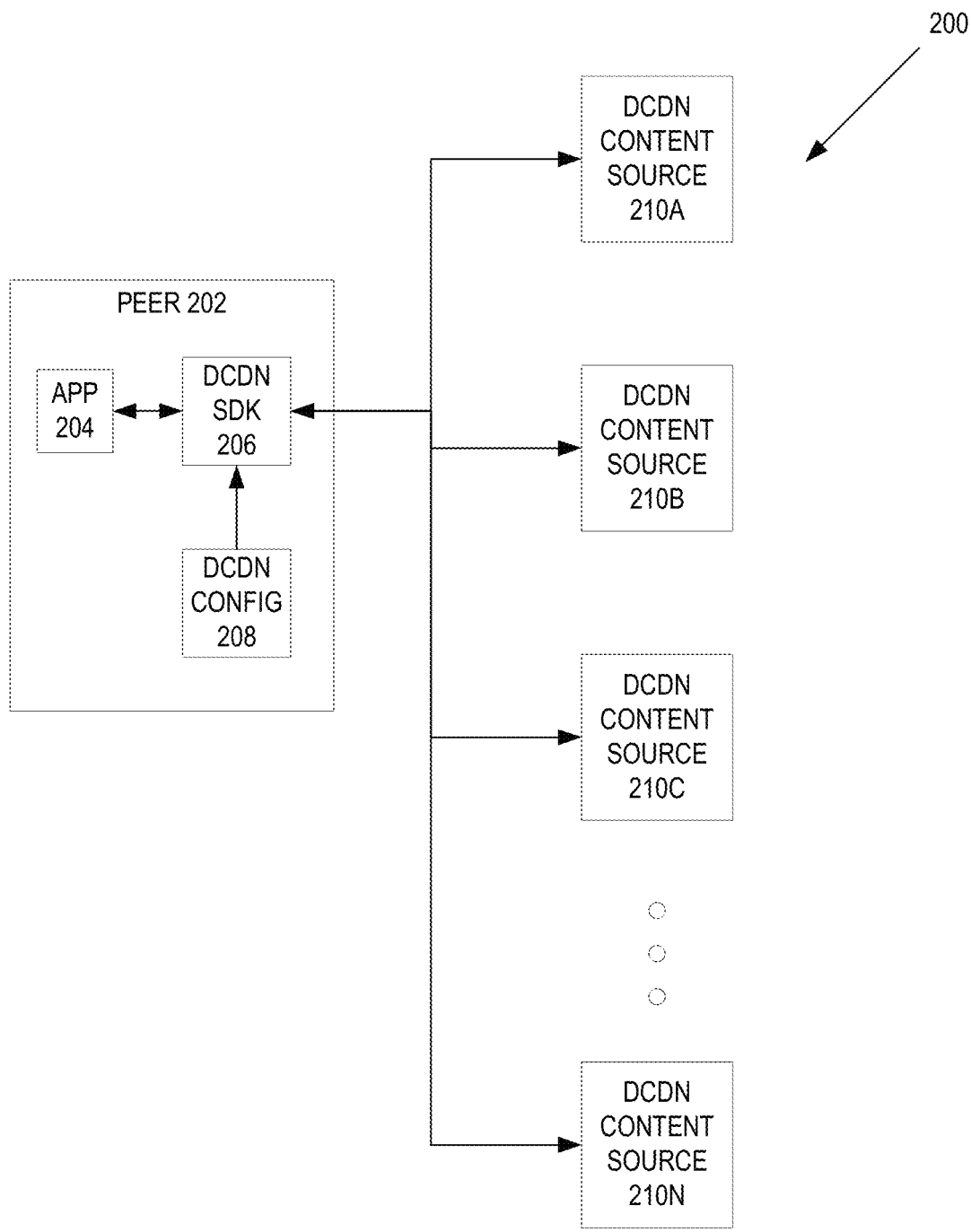
FIG. 2 is a block diagram of an embodiment of a peer retrieving content from dCDN content sources.

While in FIG. 1, the peer is illustrated downloading content from the proxy, in alternate embodiments, the peer can download from multiple content sources (e.g. multiple injectors and/or proxies). FIG. 2 is a block diagram of an embodiment of a system 200 that includes a peer 202 retrieving content from dCDN content sources 210A-N. In FIG. 2, a peer 202 can download content from one or more dCDN content sources 210A-N. In one embodiment, each of the dCDN sources 210A-N can be a peer, an injector, or a proxy as described elsewhere. Furthermore, the peer 202 can be a peer 106 as described above. In one embodiment, a peer is a device that is capable of participating in the dCDN.

In one embodiment, the peer 202 includes an application 204, dCDN SDK 206, and dCDN configuration 208. In this embodiment, the application 204 can be any type of application that is running on the peer 202 that can request content (e.g., web content, software updates, media content, and/or any other type of downloadable content). In addition, the dCDN SDK 206 is an SDK that implements the peer functionality of the dCDN. For example and in one embodiment, the dCDN SDK 206 can include functionality for locating injectors and/or proxies, making requests for the content, handling multiple requests for content, and/or other functionality.

In particular, the dCDN SDK 206 can be used to split up the download among multiple dCDN download sources. In this example, when the application 204 makes a download requests, the dCDN SDK 206 receives the requests and determines the number of content sources for the swarm that should be attempted to use. For example and in one embodiment, the dCDN SDK 206 can be configured to use tens or hundreds of content sources 210A-N. Unlike a BitTorrent client where the swarm for the content is initially defined in the torrent file, a dCDN peer 202 will use the dCDN configuration 208 to determine content sources for the requested content. In one embodiment, the dCDN configuration 208 can include a DHT that the dCDN SDK uses to determine the number of content sources and which content sources to use to download requested content. In addition, the dCDN configuration can also include cached dCDN content source addressing information (e.g., addresses and/or port information). Alternatively, the peer 202 can exchange swarm information with other peers (not illustrated). In one embodiment, a swarm is a set of nodes in the dCDN that can provide content to the peer. In this embodiment, unlike a BitTorrent swarm, which is a set of peers that share a torrent, a dCDN swarm is not limited on particular content or set of content. Instead, a dCDN swarm is a set of nodes that can provide content to the peer and is not necessarily limited to one particular piece of content.

In one embodiment, with the swarm information in the dCDN configuration 208, the dCDN SDK 206 can determine the number of dCDN content sources 210A-N and which of the dCDN content sources 210A-N to initially contact for downloading the content. For each of the dCDN content sources to use, the peer 202 determines which portion of the requested content the peer 202 should request from that dCDN content source. In one embodiment, if the peer 202 wishes to download a (potentially large) file, such as a media file or operating system update (which can be in the gigabytes of data), the peer 202 can determine to download portions from different ones of the dCDN content sources 210A-N. The portions can be the same or different sizes. Which sized portions to download from the dCDN content sources 210A-N is determined using the dCDN SDK 206. In one embodiment, the dCDN SDK 206 uses a heuristic to determine the requested size for a portion to be downloaded from a particular dCDN content source. In this embodiment, the heuristic can be based on one or more factors, such as IP address, content size, latencies to other peers, throughput, performance of peers on the same network, and/or other factors. For example and in one embodiment, the peer 202 can save latencies, performance, and/or throughput from other peers, proxies, or injectors from previous content requests. Alternatively, the peer 202 can infer performance data from another peer, proxy, or injector that is on the same network with another peer, proxy, or injector that is on the same network. In this example, if peer 202 knows about certain performance about peer A and peer B is in the network or sub-network, peer 202 can infer this performance data to peer B. In a further example, peer 202 can exchange any of these factors with other peers, proxies, and/or injectors. In another embodiment, the heuristic can include con include a factor based on newness of the peer, proxy, or injector. For example and in one embodiment, if peer 202 can request a smaller size for a peer, proxy, or injector that peer 202 has not used before as opposed to a peer, proxy, or injector that has a known set of factors.

Alternatively, or in addition, the dCDN SDK 206 can determine portion size using machine learning. For example and in one embodiment, the dCDN SDK 206 can use a neural network to determine requested sizes from a dCDN content source. In this example, the peer 202 receives a neural network, where the neural network can include training data based on known factors, such as the factors outlined above. In addition, the dCDN SDK 206 can further refine the neural network as the peer 202 gathers more information regarding the factors outlined above. In addition, dCDN SDK 206 uses a peer, proxy, or injector for each of the downloadable content portion as described in FIG. 1 above.

For example and in one embodiment, assume that the peer 202 will request twelve different portions from three different dCDN content sources (say, 210A-C). The dCDN SDK 206 determines the sizes of the twelve different portions and schedules the downloads from the three different sources 210A-C. In this example, the dCDN content sources 210A-C can either be an injector or a proxy. For example and in embodiment, the dCDN SDK 206 determines that dCDN content source 210B can handle the most bandwidth, dCDN content source 210C can handle the least bandwidth, and dCDN content source 210A falls somewhere in-between. In this example, the dCDN SDK 206 can create three large portions, four medium sized portions, and four small size portions for the downloadable content. The portions within each grouping can be the same or different. In this example, the dCDN SDK 206 would make requests to dCDN content source 210C for the large sized portions, dCDN content source 210A for the medium sized portions, and dCDN content source 210B for the small sized portions. In one embodiment, the dCDN SDK 206 can make the size requests using a range parameter in the HTTP protocol. In this embodiment, dCDN SDK 206 makes the requests using HTTP over LEDBAT protocol.

In one embodiment, the dCDN mechanism for downloading the content is different from BitTorrent in that, for each downloadable content, a BitTorrent torrent file is required. This torrent file defines even-sized pieces of the downloadable content. A BitTorrent client uses the torrent file to determine which nodes to use for downloading the different pieces of the downloadable content. In contrast, dCDN does not require a torrent file for each of the downloadable content. Instead, dCDN determines on the fly which portion of the downloadable content is be retrieved from the different dCDN content sources.

In one embodiment, the mechanism for locating content that can be served by the peers may be a DHT. Any DHT can be used, such as the BitTorrent DHT. An advantage of using the BitTorrent DHT is that this DHT ties into a large robust existing network of nodes that can store the data.

In addition, and in one embodiment, the content delivery connection(s) will work better when the content delivery connection(s) use a delay-based congestion control mechanism such as LEDBAT. Under this embodiment, the receiver measures delay in packet transfer and will infer from a positive increase in one way delays that congestion is increasing and will therefore adjust the transfer rate accordingly.

In another embodiment, use and management of multiple LEDBAT or other peer-to-peer streams allows for an increase in performance than a single stream. For example and in one embodiment, a good number of connections to keep active is up to 4 or 5, but a much larger number of open quiescent connections can significantly improve a failover time and the ability to discover better peers. In an alternative embodiment, there can be a smaller or greater number of active connections for each peer.

In a further embodiment, algorithms that govern sourcing of nodes can result in much better performance. One example of such an algorithm is to sort peers by download rate that has been obtained from them so far, and only serve return data requests from the top five. Another example is to keep track of which peers have historically provided good performance and prefer them. In one embodiment, a peer can reserve some connections purely for discovery of good peers, so that a fraction of active connections, such as one out of five, is to a random peer. Trusted content ingestion nodes (e.g., injectors) can, in one embodiment, protect the system from incorrect data inserted into the URL to content hash mapping. In one embodiment, an injector cryptographically signs the content to inject the content into the dCDN.

In the system operation as described, and in one embodiment, ingestion and serving can be consecutive steps. For systems designed to serve content with highly concentrated demand where a few hot resources are a substantial fraction of total demand, this is sufficient. When the content large, and in a further embodiment, however, the system to simultaneously ingest and serve from trusted nodes. For example and in one embodiment, the content is a heavily anticipated large system update for a mobile device. In this example, as soon as the update is made available, numerous peers would want to download the system update from one or more injectors. As each of the injectors start to ingest the system update, parts of the system update are ready to be downloaded by peers connecting to the injectors. In one embodiment, by using a Merkle tree to ingest the content, parts of the system update can be authenticate and ready for distribution.

In this embodiment, when a mapping from URL to content hash is not yet known (because the full content has not been downloaded yet), one or more trusted nodes (such as an injector) can start to download the content to both learn the content hash and to seed the content in the dCDN system. These trusted nodes can start serving this content immediately before they finish the download. This speeds up the first time a resource is requested by a client the most.

In one embodiment, the dCDN can operate by sending data in cleartext. In an alternate embodiment, if the original static resource is served using HTTPS rather than HTTP, it better matches the security properties to use opportunistic encryption on transport connections. In this embodiment, the data is encrypted using a symmetric cipher, such as a block cipher in counter mode, with a key negotiated at the beginning of connections or computed using identities of the nodes. Negotiation involves an additional round-trip. A way to avoid the extra round trip is to identify nodes by their public keys and use the knowledge of associated private keys to avoid the additional round-trip. In the most minimal case, each side can choose its own key and initialization vector and, optionally, HMAC key and transmit the material to the other side at the beginning of the connection, with the keys encrypted using the recipient's public key. Any public key encryption scheme, block cipher, and HMAC are suitable for this approach.

The dCDN can rely on only a sole origin URL. However, CDN customers are increasingly interested in using multiple CDNs. In one embodiment, the dCDN, architecturally, is in a unique position of being able to optimize the use of multiple underlying CDNs, balancing cost and performance. In this embodiment, the distributed part of the dCDN becomes one of the underlying CDNs that can be used to be balanced with other CDNs. One approach of such optimization is to assign monetary costs to each underlying CDN (including the origin) and to minimize a utility function that balances cost, expected before arrival, and expected variance of the download rate. Any function monotonic in each parameter can be used as such a utility function.

In a peer-to-peer system, such as BitTorrent, a node participates in a swarm for the purpose of obtaining the data for that node's own use. In one embodiment, the dCDN can incorporate altruistic nodes, which are nodes that are used to help others. In this embodiment, the motivation to introduce the altruistic nodes is to make the system work better. Altruistic node can be introduced by an operator of the dCDN as, effectively, a form of alternative light-weight infrastructure. The naïve approach of having altruistic nodes act identically to normal nodes while seeding the content indefinitely is, somewhat surprisingly, suboptimal, because acting in this way, the node will download the content that nodes wants to help serve exactly once. To break even, the altruistic node will need to upload this content once on average. Moreover, when the node is downloading the content, it is taking up resources that might be better spent delivering the content to its ultimate beneficiary. For example, consider a simplified situation with one seeder, one downloader, and one altruistic node, all with network connections of the same symmetrical capacity; it is easy to see that in this case, the optimal behavior for the altruistic node is to do nothing until the downloader has the file, as any network activity by the altruistic node increases the time to arrival of the content at the destination without any reduction in the download rate variance or cost. In another embodiment, one approach much better than download-everything is for altruistic nodes to initially download only small and ideally non-overlapping portions of the content. For example and in one embodiment, most conservatively, if there are many such nodes, each altruistic download a single block and wait with downloading more until the downloaded is served k times (k~2 helps minimize the risk that a second block won't be successfully served).

Usually with peer-to-peer systems, such as BitTorrent, only logical connections established over the existing Internet links are used. In one embodiment, with dCDN, device-to-device connectivity makes it possible to use the additional capacity of wireless connections established in physical proximity to transfer data. The nearby connections can be Bluetooth, Bluetooth Low Energy, ANT, Wi-Fi ad hoc, Wi-Fi Direct, NFC, Airdrop, Wi-Fi Aware, and other device-to-device connectivity options. The dCDN is able to take advantage of connections built in background seamlessly without a need for user interaction. In a further embodiment, the dCDN can use multiple connections of different types concurrently (e.g., Wi-Fi for one connection and Bluetooth for another connection).

In one embodiment, the dCDN content hash can be any hash that uniquely identifies the content. In particular, the content hash can be the BitTorrent infohash, providing BitTorrent compatibility with the ability to download objects from the BitTorrent network, enabling the dCDN to act as an advanced BitTorrent client, and giving access to substantial amounts of existing content. For example, Amazon S3 content is available via BitTorrent.

In a further embodiment, peers in the dCDN are able to exchange information about other peers, rapidly discovering other nodes in the system. For example and in embodiment, peers can exchange information about injector and proxy nodes. This allows a particular peer to select from a greater range of possible injector and/or proxy nodes.

While in one embodiment, the dCDN is incorporated in a library or an SDK incorporated into another application, dCDN can be used as a client making the full use of the system. Two examples of such clients are a dCDN-enabled web browser and a BitTorrent client.

In addition to the two modes of content ingestion described above, a more sophisticated mode, a Byzantine reputation system for content ingestion nodes, is possible. In this mode and embodiment, as in the mode where ingestion can be done by anyone, any node that wants to participate in content ingestion may attempt to do so. However, as in the trusted node ingestion mode, the content is protected and delivered securely even in the presence of malicious nodes in the system. Nodes with neutral reputation need to perform ingestions that are probabilistically checked by nodes with high positive reputation. When ingestion is performed timely and correctly (the content hashes coincide), the node's reputation improves. Otherwise, the node's reputation plummets.

In one embodiment, multiple connections to the same origin can help to both improve the download rate and reduce the variance of the download rate. In the case of resources identified by URLs with HTTP or HTTPS, HTTP range requests can be used to obtain different parts of the resource. In this embodiment, four is a good number of connections; even at two connections, however, notable improvements can be obtained, particularly improving the experience on lossy network links. As the number of connections increases, the returns from additional connections diminish, until performance actually starts going down. The peak location depends on a variety of network conditions, but it rarely makes sense to go beyond 16 connections, and two is enough for smaller files in particular. Four is a reasonable compromise, working well across a range of network conditions when there's a possibility that the conditions are particularly bad or the file is large, such as a software update or a video stream or download.

In one embodiment, it is better to achieve low extra delays in the network on the transport layer. However, in some situations it can be preferable to accomplish low delays with changes to the network itself rather than the transport protocol implemented end-to-end by the end nodes. In this case, the network device at the bottleneck of the connection, such as a router, a switch, or a cable or DSL modem can accomplish it with Active Queue Management (AQM).

System Overview and Terminology

The system consists of injectors, which form a trusted service that runs in the cloud and of peers. Some peers act as injector proxies; injector proxies simply as proxies. Each injector possesses a private injector key. Each peer has a hardcoded copy of all injector public keys.

In one embodiment, the injectors are used to initially obtain content from a web origin and to place it into the peer-to-peer (dCDN) network. While in one embodiment, peers can use the BitTorrent distributed hash table (DHT) to find injectors, injector proxies, and/or other peers interested in the same or similar content, in alternate embodiments, peers can use a different mechanism to find injectors, injector proxies, and/or other peers (e.g., cached injector information, peer exchange, and/or other types of information exchange mechanisms).

In a further embodiment, the peers can use Low Extra Delay Background Transport (LEDBAT) in Micro Transport Protocol (uTP) framing to connect to one another, as well as to injector proxies and injectors. Alternatively, the peers can use different can use a different transport protocol for the download of the content portions (for example, Transmission Control Protocol (TCP), User Datagram Protocol (UDP), and/or other types of transport protocols). The peer-to-peer and device-to-device connections are called transport connections and run the peer protocol.

Injector Behavior

The injector, in one embodiment, is a daemon that runs in the cloud. When an instance of an injector starts, the injector announces its Internet Protocol (IP) address and port number in the BitTorrent DHT of the injector swarm, SHA-1 ("injectors"), to make this injector easier to be found. The injector can accept transport connections from peers and injector proxies. In one embodiment, an injector is used as a trusted source to add content to the dCDN by signing the content as described above. In addition, the injector swarm is the set of injectors that available in the dCDN, In one embodiment, the injector swarm is stored in the DHT.

In one embodiment, the DHT is a distributed table that stores (key, value) pairs. A peer can lookup information using a key, such as a 160-bit key. In this embodiment, the key can be generated using a cryptographic hash function, such as Secure Hash Algorithm-1 (SHA-1). With the key, a peer can lookup for injectors, injector proxies, URLs, or domains in the DHT (e.g., using the keys SHA-1 ("injectors"), SHA-1 ("injector proxies"), SHA-1 ("URLs"), or SHA-1 ("domains")). The peer would perform the lookup and read the value(s) associated with the key in the DHT. Furthermore, and in one embodiment, the dCDN is repurposing the DHT, so as to store different types of information than was used for BitTorrent. In one embodiment, an injector announces itself by inserting characteristics of this injector into the DHT. In a further embodiment, an injector can include the content signature when an URL is inserted into the DHT. In this embodiment, if the content signature includes a Merkle tree, the Merkle tree is inserted in the DHT.

Injector Verification Challenge

In one embodiment, a peer may challenge an injector or an injector proxy. Successful response to the challenge verifies that the challenged entity can connect to (or is) an injector.

In one embodiment, to avoid pointlessly fetching external URLs, the TRACE method is used. This method of HTTP echoes back the request from the peer. Since the injector signs its responses with the X-Sign header, the response is guaranteed to have come from an injector if the challenge is unique. The challenge includes a cryptographically secure random nonce.

The format of the challenge is TRACE/(uuid) HTTP/1.1. The response is the echoed request with an added X-Sign header. In another embodiment, the injector signs the response with an X-mSign header. In this embodiment, the X-mSign header includes a Merkle tree.

Peer Behavior

A peer performs some actions on start and some actions for each download request.

Peer Behavior on Start

When a peer starts, it connects to an injector and, if successful, becomes a proxy. If not successful, it connects to a proxy instead. This works as follows.

Connect to an Injector

When a peer starts, the peer attempts to connect to an injector. To do so, the peer can find injectors using the following methods:

1. read the injector swarm (using the announce_only_get flag),
2. use hardcoded IPs and ports,
3. use IPs and ports cached from previous runs, and
4. use peer exchange for the injector swarm.

After connecting to an injector, a peer may verify that the injector is real using the injector verification challenge.

Become a Proxy, or Connect to One

If the peer connected to an injector successfully, the peer can start acting as an injector proxy.

If the peer failed to connect to an injector, the peer can connect to an injector proxy. To find an injector proxy, the peer can use the following methods:

1. read the injector proxy swarm (SHA-1 ("injector proxies")),
2. use IPs and ports cached from previous runs, and
3. use peer exchange for the injector proxy swarm.

Peer Behavior on Request

When a peer gets a request for content identified by a URL from the application, in one embodiment, the peer opens an origin connection and tries to start getting the object as usual using HTTP or HTTPS. In addition, the peer differentiates between static and dynamic requests. Static requests are those where the content is public and would be usable by many other people requesting the same URL. Dynamic requests are those that return private or personalized content. For example, the front page of The New York Times is static, while the Facebook feed is dynamic. The peer may treat GET requests as static and POST as dynamic. This is the bare minimum for differentiating between the two. The peer can have substantially more sophisticated heuristics than the minimum GET/POST difference. Note that static resources may be mutable. It is not the immutability, but scope of permitted and useful applicability that makes a resource static.

Peer Behavior on Static Request

In addition to the origin connection, the peer can immediately announce on the URL swarm and start trying to establish up to 1 peer connection. In one embodiment, each URL has an associated swarm used to find other peers interested in this content. The URL swarm is currently SHA-1 ("URL"). It is anticipated that this will change in a future protocol version due to two different concerns: DHT scalability and security. If there's no-one found on the URL swarm who has a valid unexpired URL content signature, the peer can ask an injector or an injector proxy, whichever the peer is connected to, to inject the URL. A peer can remain in the URL swarm after download is finished and until the soonest of the following:

max seed ratio is reached,
the signature expires,
the signature becomes obsolete due to the presence of a newer signature,
one week elapses, or
the content is deleted from OS cache or due to space constraints.

The peer may suspend participation in the swarm due to resource, battery, or policy constraints. When such constraints are lifted, the peer SHOULD resume seeding.

Peer Behavior on Dynamic Request

If the peer is successful in communicating with the origin, it can simply get the response from the origin and not involve the peer-to-peer network. If that does not work, the peer can use an injector proxy and use the HTTP CONNECT method to reach the origin. In either case, the peer should not split any byte range splitting as dynamic requests often have non-idempotent side effects. The peer can cache the method by which it has received the last dynamic response from a given domain and reuse it to avoid multiple timeouts when origin is not available directly, but available through a proxy.

Injector Proxy Behavior

The injector proxy can forward peer protocol requests to the injector and may serve HTTP CONNECT method requests.

Peer Protocol

In one embodiment, the peer protocol is HTTP over LEDBAT, with an additional header. Range requests are used to get parts of the file. The content is authenticated using a public key signature produced by the injector. The signature is sent in X-Sign header. X-Sign authenticates the entire file, but does not authenticate any parts.

When an injector first injects the object, the injector starts sending the object before the injector has seen the whole thing, and so the signature cannot be sent at the beginning where headers normally go. In this embodiment, the injector can send the X-Sign header as a trailer with a last empty chunk.

When two peers are exchanging data, these peers can have to open two separate connections to send data in each direction. In an alternative embodiment, the direction of change that appears most desirable for the future is an adoption of a subset of BitTorrent v2, for the unlimited granularity of verification.

Technically, and in one embodiment, the injector transmits the X-Sign so as inject the file. The client can at that point fetch the file through an untrusted injector proxy. However, given that to produce the X-Sign the injector needs the whole object, it makes sense that the injector also sends the first copy that the client can later seed to other peers.

X-Sign Format

X-Sign is a signed message that consists of the ASCII characters "sign" (4 bytes), timestamp when the message was generated (4 bytes), and of the hash of the content. The content includes HTTP headers other than X-Sign. One of the headers whenever peer protocol is used is a Content-Location, so that the URL is authenticated. X-Sign is transmitted base-64 encoded.

In other words, $$X\text{-}Sign=base64(sign(\text{``sign''}+timestamp+hash(headers+content))).$$

Here, in one embodiment, sign( ) and hash( ) are the default primitives in libsodium.

Policy Settings

An app incorporating NewNode may change the defaults for policy settings. In addition, an app may expose some or all of these settings to a user and allow the user to override the app's defaults. There are, thus, three levels of decision-making: the NewNode specification, which provides the defaults suitable for the widest variety of apps, an app developer, who can change the defaults to what makes the most sense for the specific app and its users, and, finally, the user.

The list of policy settings and their defaults is as follows:
connect to origin (default: ON)
act as a proxy (default: ON)
only act as a proxy on Wi-Fi (default: ON)
only act as a proxy when plugged into external power (default: ON)
encrypt peer connections (default: the inverse of connect to origin)
max seed ratio (default: 3)
max storage (NO default, use OS cache)

Figure 3:
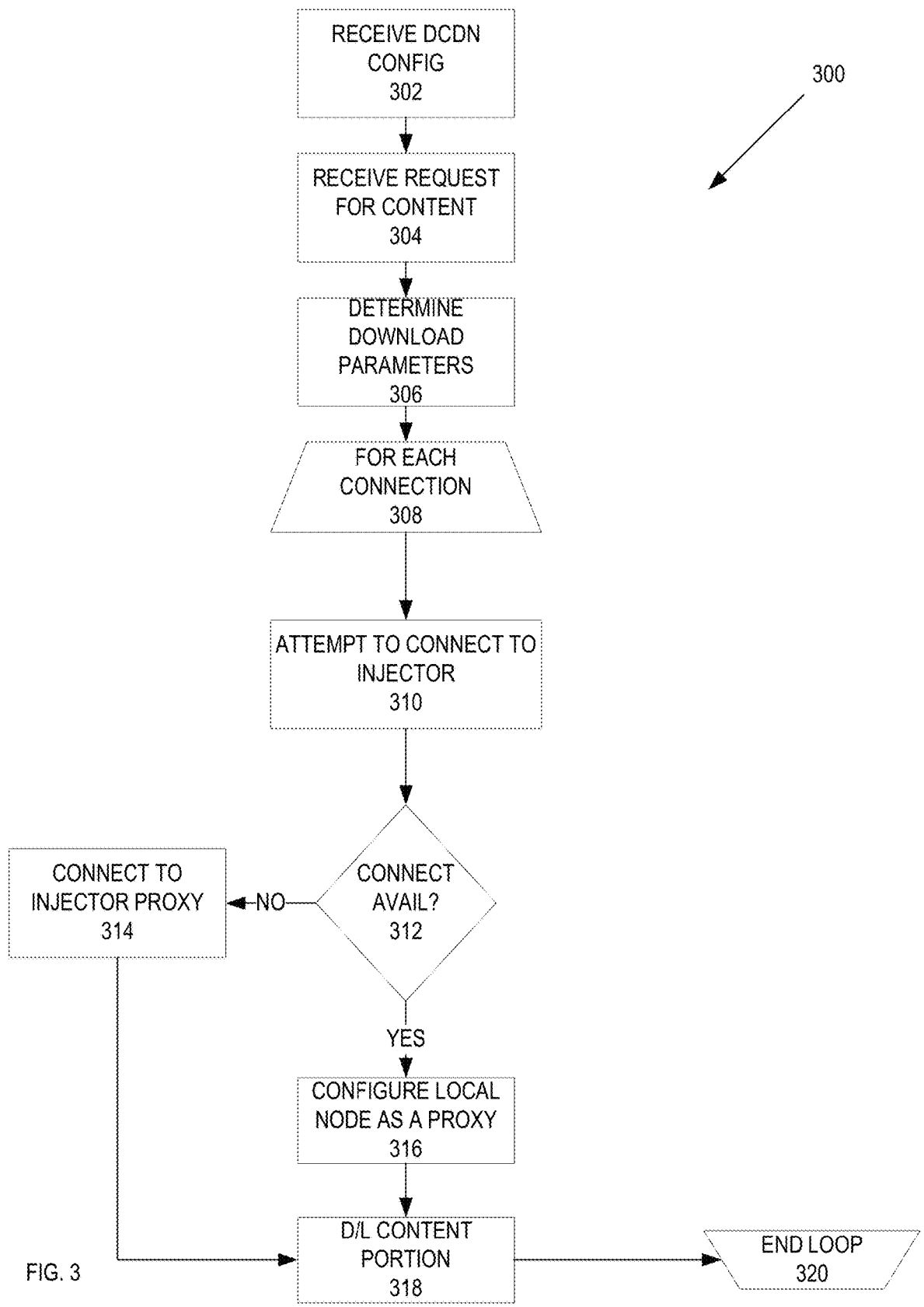
FIG. 3 is a flow diagram of an embodiment of a process to retrieve content from multiple dCDN content sources.

In one embodiment, a peer can use dCDN to download from one or more nodes (e.g., multiple peers, injectors, injector, or a combination therein). FIG. 3 is a flow diagram of an embodiment of a process 300 to retrieve content from multiple dCDN content sources. In FIG. 3, process 300 begins by receiving dCDN configuration for a peer at block 302. In one embodiment, the dCDN configuration can include configuration for whether to connect to the origin, should the peer act as a proxy, act as a proxy if on Wi-Fi, act as a proxy if plugged into external power, whether to encrypt peer connections, maximum seed ratio, maximum storage, maximum number of connections for a download, and/or other types of configurational information. At block 304, process 300 receives a request to download content. In one embodiment, process 300 receives the request from an application (e.g., a web browser, software updater, media application, and/or another type of application that downloads files).

Process 300 determines the download parameters for the content request at block 306. In one embodiment, the download parameters can be number of content bytes to download, maximum number of active connections, and/or any other parameters for managing the download process. In one embodiment, process 300 determines the content byte value from the header information returned on a request. In this embodiment, process 300 retrieves the header for the content by using either a GET or a HEADER HTTP request. In one embodiment, process 300 can use a GET HTTP request if process 300 may determine that the requested content is relatively small. Alternatively, if process 300 determines that the requested would be large, process 300 uses a HEADER HTTP request. In a further embodiment, process 300 can always use a GET HTTP request. If the requested is large and process 300 can use further dCDN content sources to retrieve the content, process 300 can close the connection after the header for the content is retrieved.

In addition, process 300 determines which nodes to use for the download of the content at block 306. In one embodiment, process 300 can utilize one or more nodes (e.g., multiple peers, injectors, injector, or a combination therein) to download the content. In this embodiment, process 300 chooses which nodes to use from the download based on a variety of factors. For example and in one embodiment, process 300 can find nodes to download content from the DHT, local discovery, peer exchange, and/or information provided by an injector. In one example and embodiment, process 300 can discover nodes from the DHT. In this example, process 300 can search the DHT using the strings "injectors," "injector proxies," and/or "peers" to search the DHT for the various types of nodes that can help download content. In another example, process 300 can maintain a list of nodes that can be used for downloading the content. In a further example, process 300 can exchange peer information with other peers, where this peer information can be used to select nodes for the downloading content. In another example, process 300 can receive peer information from an injector in response to process 300 requesting a download from that injector.

In one embodiment, with the node information, process 300 can select one or more nodes to download the content. In one embodiment, process 300 can select on a variety of factors (e.g., latency of communications, local vs. remote network location, bandwidth availability, and/or other types of factors based on network characteristics). If process 300 just has an IP address for a node, process 300 can just use that node for download of a portion of the content and collect performance information regarding that node.

Process 300 performs a processing loop (blocks 308-320) to download different portions of the content using different nodes in the dCDN. At block 310, process 300 attempts to connect to an injector. In one embodiment, process 300 identifies the injector node using a BitTorrent DHT. In one embodiment, an injector can be a general injector for all types of content, be restricted to a particular subset of content (e.g., there can be an injector for a URL domain or group of domains, or can be for one particular content). In one embodiment, process 300 connects to the injector using the TRACE option of the HTTP protocol as described above.

Process 300 checks to see if the connection to the injector is available at block 312. If there is not a connection available to the injector, execution proceeds to block 314 below. If there is a connection available to the injector, process 300 configures the local node as a proxy for the injector at block 316. In one embodiment, an injector proxy acts as a proxy for the injector and can transmit the content as a whole or portions of the content to the requestor.

At block 318, process 300 downloads the content from either the injector or the injector proxy (or peer). In one embodiment, process 300 requests the whole content. In another embodiment, process 300 can requests download of a portion of the content. In this embodiment, which portion to download can be based on a heuristic for the target node (e.g., the peer, injector or injector proxy), machine learning, or some other mechanism, as described above. In one embodiment, process 300 can use a characteristic of the injector or injector proxy to determine the size of the portion of the content to be downloaded (e.g., delay between the peer and the node, available bandwidth, and/or other types of characteristics). For example and in one embodiment, if process 300 may decide to download a 2 megabyte (MB) portion of a movie file from an injector node that is in the cloud and a 10 MB portion from a laptop node that is an injector proxy or peer and is in the same local network as the requesting peer. In one embodiment, process 300 requests the content portion using HTTP over LEDBAT. To download portions of the content, process 300 uses the range parameter of the HTTP protocol. At block 320, the processing loop ends.

At block 314, process 300 connects to an injector proxy if process 300 cannot connect to the injector. In one embodiment, the injector proxy is a proxy for a different injector than the injector originally receiving a connection request from process 300. Execution proceeds to block 318 above.

Figure 4:
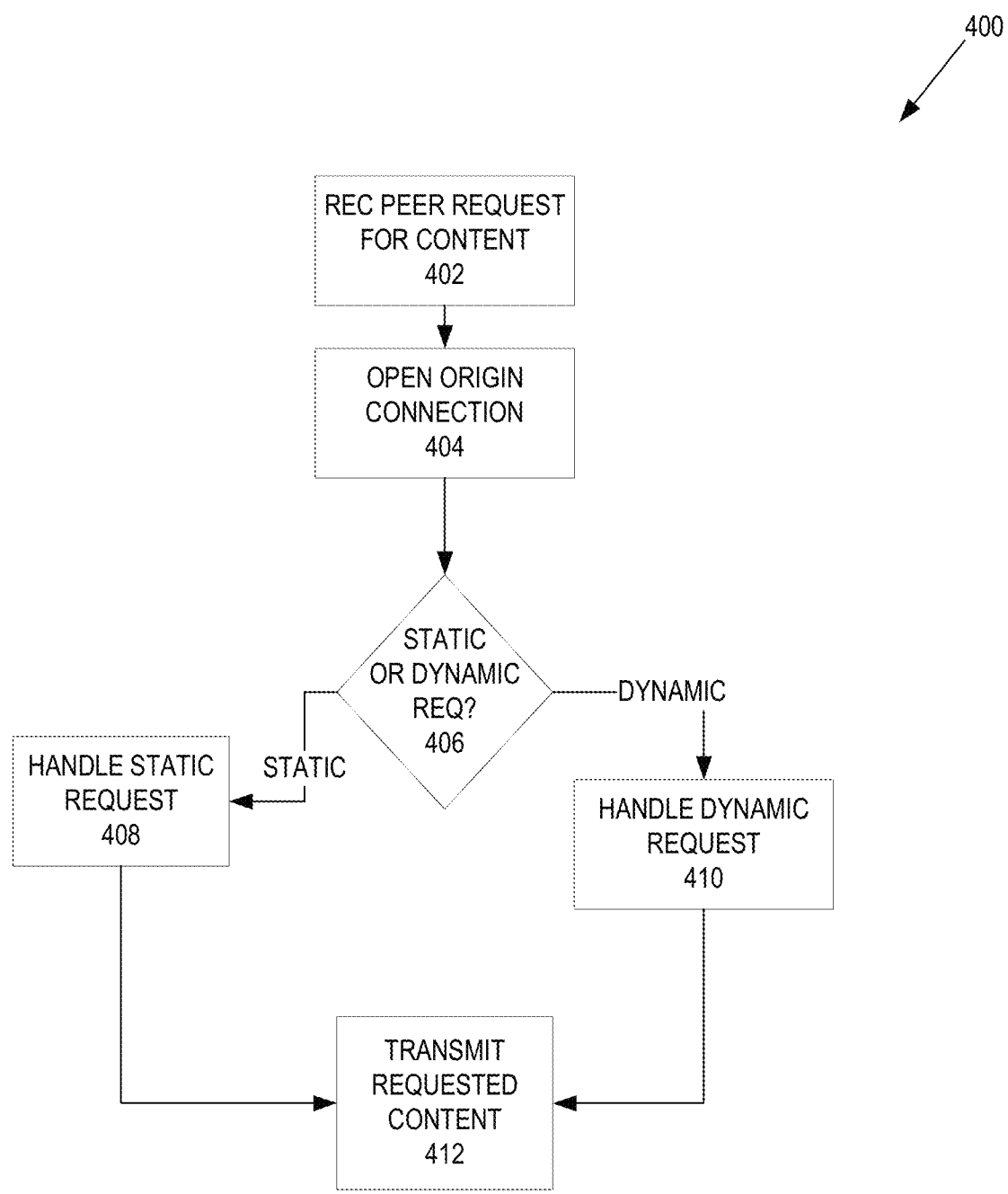
FIG. 4 is a flow diagram of an embodiment of a process to handle a peer request for content.

As above, a peer, injector proxy, or injector can receive a request to download content or a portion of the content. In one embodiment, the injector proxy may not have the content and will contact an injector for the content before sending the content to the peer requestor of the content. FIG. 4 is a flow diagram of an embodiment of a process 400 to handle a peer request for content at block 402. In FIG. 4, process 400 receives a peer request to download content for a URL. In one embodiment, the request can be for the entire content or can be for a portion of the content. In one embodiment, process 400 receives an HTTP request for the content. At block 404, process 400 opens an origin connection. In one embodiment, the origin connection is a connection to the device represented by the URL.

At block 406, process 400 determines if the request is a static or a dynamic request. In one embodiment, process 400 determines whether the request is static or dynamic based on the type of request received by process 400. In this embodiment, if the HTTP request was a GET, process 400 determines that the request is a static request. Alternatively, if the request was a POST, process 400 determines that the request is a dynamic request. In one embodiment, static requests are those where the content is public and would be usable by many other people requesting the same URL and dynamic requests are those that return private or personalized content.

Process 400 handles the static requests at block 408. In one embodiment, in addition to the origin connection, process 400 should try to establish another peer connection using a URL swarm as described above. Execution process to block 412 below. At block 410, process 400 handles the dynamic request. In one embodiment, if process 400 is successful in communicating with the origin, process 400 simply gets the response from the origin. If process 400 cannot connect with the origin, process 400 finds an injector proxy to retrieve the content from. Furthermore, process 400 can cache the method process 400 used to retrieve the content. Execution proceeds to block 412 below. At block 412, process 400 transmits the requested content to the peer that requested it.

Figure 5:
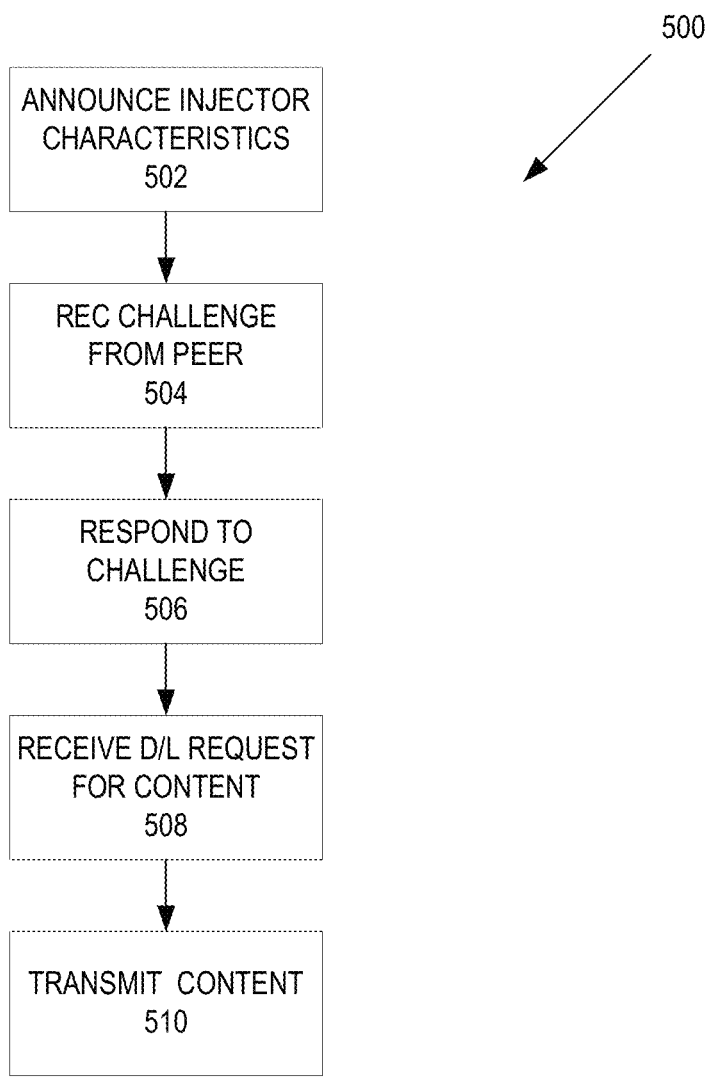
FIG. 5 is a flow diagram of an embodiment of a process to respond to an injector challenge.

FIG. 5 is a flow diagram of an embodiment of a process 500 to respond to an injector challenge. In FIG. 5, process 500 announces the injector characteristics at block 502. In one embodiment, the injector announcement is performed when the injector starts up. In a further embodiment, the injector announces its IP address and port number in the BitTorrent DHT in the injector swarm. At block 504, process receives a challenge from a peer. In one embodiment, the challenge can be used by a peer to determine if the peer can make a connection to the injector. In one embodiment, process 500 receives a TRACE over HTTP request. Process 500 sends a response to the TRACE over HTTP request, at block 506, by adding an X-Sign header to the echoed request as described above. At block 508, process 500 receives a request to download the content. In one embodiment, the download request can be an HTTP request over LEDBAT protocol as described above. In addition, the request may or may not include a range parameter instructing process 500 to download just apportion of the requested content. Process 500 transmits the requested content at block 510.

Figure 6:
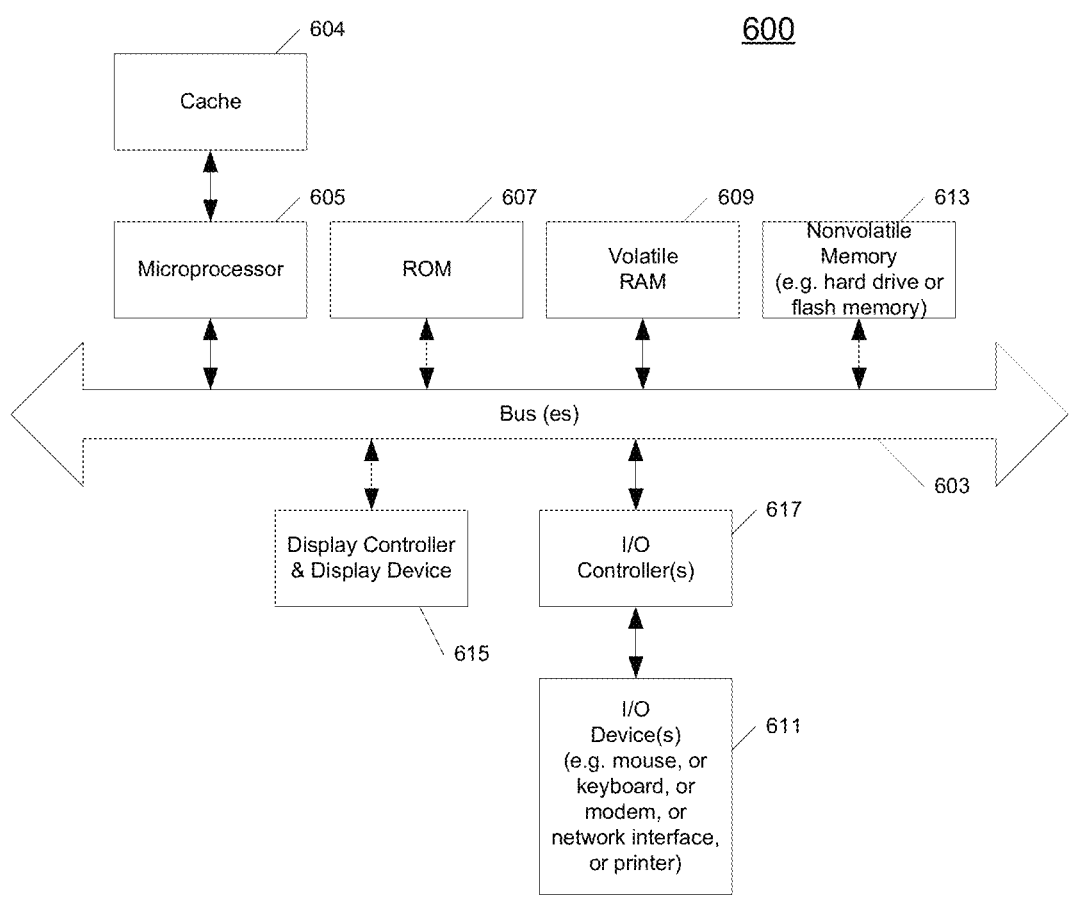
FIG. 6 illustrates one example of a typical computer system, which may be used in conjunction with the embodiments described herein.

FIG. 6 illustrates one example of a typical computer system, which may be used in conjunction with the embodiments described herein. For example, the system 600 may be implemented including a NewNode peer 106 as shown in FIG. 1 above. Note that while FIG. 6 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 6, the computer system 600, which is a form of a data processing system, includes a bus 603 which is coupled to a microprocessor(s) 605 and a ROM (Read Only Memory) 607 and volatile RAM 606 and a non-volatile memory 611. The microprocessor 605 may include one or more CPU(s), GPU(s), a specialized processor, and/or a combination thereof. The microprocessor 605 may retrieve the instructions from the memories 607, 609, 611 and execute the instructions to perform operations described above. The bus 603 interconnects these various components together and also interconnects these components 605, 607, 609, and 611 to a display controller and display device 616 and to peripheral devices such as input/output (I/O) devices which may be mice, keyboards, modems, network interfaces, printers and other devices which are well known in the art. Typically, the input/output devices 615 are coupled to the system through input/output controllers 613. The volatile RAM (Random Access Memory) 606 is typically implemented as dynamic RAM (DRAM), which requires power continually in order to refresh or maintain the data in the memory.

The mass storage 611 is typically a magnetic hard drive or a magnetic optical drive or an optical drive or a DVD RAM or a flash memory or other types of memory systems, which maintain data (e.g. large amounts of data) even after power is removed from the system. Typically, the mass storage 611 will also be a random access memory although this is not required. While FIG. 6 shows that the mass storage 611 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 603 may include one or more buses connected to each other through various bridges, controllers and/or adapters as is well known in the art.

Figure 7:
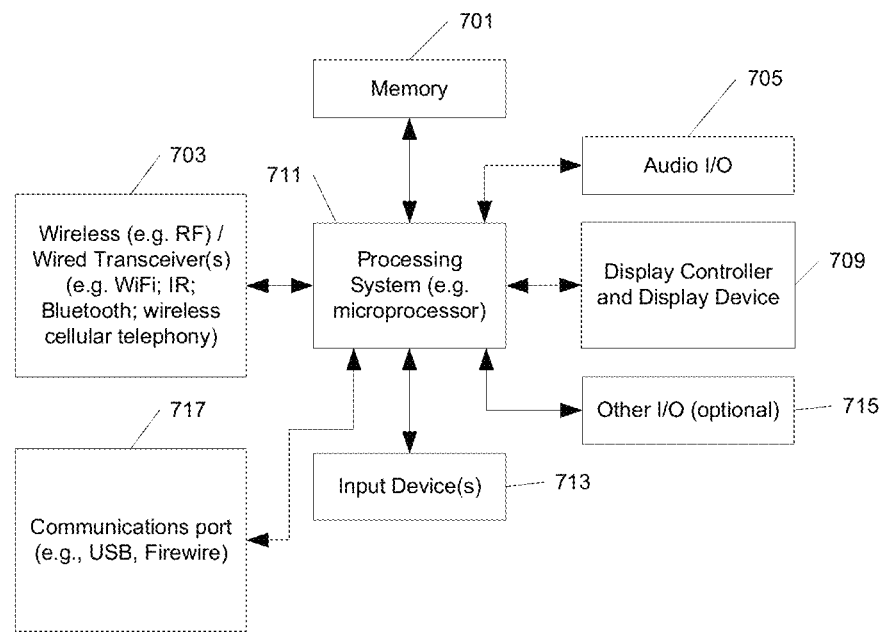
FIG. 7 shows an example of a data processing system, which may be used with one embodiment of the present invention.

FIG. 7 shows an example of a data processing system, which may be used with one embodiment of the present invention. For example, system 700 may be implemented as a build system 76 as shown in FIG. 1 above. The data processing system 700 shown in FIG. 7 includes a processing system 711, which may be one or more microprocessors, or which may be a system on a chip integrated circuit, and the system also includes memory 701 for storing data and programs for execution by the processing system. The system 700 also includes an audio input/output subsystem 705, which may include a microphone and a speaker for, for example, playing back music or providing telephone functionality through the speaker and microphone.

A display controller and display device 709 provide a visual user interface for the user; this digital interface may include a graphical user interface which is similar to that shown on a computer when running operating system software with a graphical user interface, or smartphone when running an operating system with a graphical user interface, etc. The system 700 also includes one or more wireless transceivers 703 to communicate with another data processing system, such as the system 700 of FIG. 7. A wireless transceiver may be a WLAN transceiver, an infrared transceiver, a Bluetooth transceiver, and/or a wireless cellular telephony transceiver. It will be appreciated that additional components, not shown, may also be part of the system 700 in certain embodiments, and in certain embodiments fewer components than shown in FIG. 7 may also be used in a data processing system. The system 700 further includes one or more communications ports 717 to communicate with another data processing system, such as the system 900 of FIG. 9. The communications port may be a USB port, Firewire port, Bluetooth interface, etc.

The data processing system 700 also includes one or more input devices 713, which are provided to allow a user to provide input to the system. These input devices may be a keypad or a keyboard or a touch panel or a multi touch panel. The data processing system 700 also includes an optional input/output device 715 which may be a connector for a dock. It will be appreciated that one or more buses, not shown, may be used to interconnect the various components as is well known in the art. The data processing system shown in FIG. 7 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 700 may be a network computer or an embedded processing device within another device, or other types of data processing systems, which have fewer components or perhaps more components than that shown in FIG. 7.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "attempting," "receiving," "downloading," "finding," "creating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed:

1. A non-transitory machine-readable medium having executable instructions to cause one or more processing units to perform a method to download content to a local device using a decentralized content distribution network, the method comprising:

receiving a request, at the local device, from an application to download content using the decentralized content distribution network;

determining, by the local node, a plurality of nodes in the decentralized content distribution network to download the content; and for each node in the plurality of nodes, attempting to establish communications between the local device and that node by challenging the node so as to verify that the node can communicate with the local device, wherein the challenge is based on at least echoing an initial content request, downloading a portion of the content from that node if communication is established between the local device and that node, wherein a size of the portion is based on at least a network characteristic of that node, the local device becomes a proxy node for that node when that node is a cloud injector for the content, and the cloud injector node authenticates the content by cryptographically signing the content, and downloading a portion of the content from a proxy node if communication cannot be established between the local device and that node, wherein the size of the portion is based on at least a network characteristic of that proxy node.

2. The machine-readable medium of claim 1, wherein each of the plurality of nodes obtains the content and places the content into the decentralized content distribution network.

3. The machine-readable medium of claim 1, wherein the proxy is a proxy for a different one of the plurality of nodes.

4. The machine-readable medium of claim 1, further comprising:
finding the plurality of nodes based on at least one of a distributed hash table, static information of the plurality of nodes, cached information of the plurality of nodes, or a peer exchange of information for the plurality of nodes.

5. The machine-readable medium of claim 1, further comprising:
finding the proxy node based on at least one of a distributed hash table, cached information of the plurality of nodes, or a peer exchange of information for the plurality of nodes.

6. The machine-readable medium of claim 1, wherein the cryptographic signing includes a Merkle tree.

7. The machine-readable medium of claim 1, wherein the local device communicates with at least one of the plurality of nodes or the proxy using the Low Extra Delay Background Transport protocol.

8. The machine-readable medium of claim 1, wherein the proxy node is a proxy for a node that obtains the content and places the content into the decentralized content distribution network.

9. The machine-readable medium of claim 1, further comprising:
configuring the local device as a proxy node when the local device can communicate with the injector node.

10. A machine-readable medium of claim 1, wherein a communication is one or more of a Local Area Network connections, Bluetooth, Bluetooth Low, Bluetooth Smart, Wi-Fi Direct, Wi-Fi Aware, ANT, ANT+, AirDrop, Oxygen, or a combination of different device-to-device connections.

11. A method to download content to a local device using a decentralized content distribution network, the method comprising:
receiving a request, at the local device, from an application to download content using the decentralized content distribution network;
determining, by the local node, a plurality of nodes in the decentralized content distribution network to download the content; and
for each node in the plurality of nodes,
attempting to establish communications between the local device and that node by challenging the node so as to verify that the node can communicate with the local device, wherein the challenge is based on at least echoing an initial content request,
downloading a portion of the content from that node if communication is established between the local device and that node, wherein the size of the portion is based on at least a network characteristic of that node, the local device becomes a proxy node for that node when that node is a cloud injector for the content, and the cloud injector node authenticates the content by cryptographically signing the content, and
downloading a portion of the content from a proxy node if communication cannot be established between the local device and that node, wherein a size of the portion is based on at least a network characteristic of that proxy node.

12. The method of claim 11, wherein each of the plurality of nodes obtains the content and places the content into the decentralized content distribution network.

13. The method of claim 11, further comprising:
finding the plurality of nodes based on at least one of a distributed hash table, static information of the plurality of nodes, cached information of the plurality of nodes, or a peer exchange of information for the plurality of nodes.

14. The method of claim 11, further comprising:
finding the proxy node based on at least one of a distributed hash table, cached information of the plurality of nodes, or a peer exchange of information for the plurality of nodes.

15. The machine-readable medium of claim 1, wherein the injector node prepares the content for the decentralized content distribution network.

16. The method of claim 11, wherein the injector node prepares the content for the decentralized content distribution network.

* * * * *